United States Patent

Beathan

[15] 3,662,109

[45] May 9, 1972

[54] HANDSET LIFTER

[72] Inventor: Mark A. Beathan, 344 King Road West, Ithaca, N.Y. 14850

[22] Filed: Jan. 6, 1970

[21] Appl. No.: 941

[52] U.S. Cl. .......... 179/1 HS, 179/178

[51] Int. Cl. .......... H04m 1/08

[58] Field of Search .......... 179/161, 1 C, 1 HS, 146, 178

[56] References Cited

UNITED STATES PATENTS 3,296,382 1/1967 Klumb et al. .......... 179/99

*Primary Examiner*—William C. Cooper

*Attorney*—Lawrence E. Laubscher

[57] ABSTRACT

A telephone accessory for raising the handset of a desk type telephone from an initial rest position on the cradle means of the telephone base toward an elevated position in which the handset is supported at a height sufficient to permit the switch operating plunger means to extend from the telephone base to electrically connect the telephone instrument for dialing and transmission and reception. The invention is characterized in that the accessory comprises a unitary body member that is formed of sheet material and includes cam and supporting planes. The accessory is rearwardly displaceable, when the handset is in the initial rest position, from an initial forward position relative to the handset toward a rearward position in which the cam plane operates to raise the handset to the aforementioned elevated position. The handset may then be completely removed from the cradle, and upon subsequent replacement of the handset in an inclined position in the cradle, the handset will engage the cam plane to automatically slide the accessory to the forward position, thereby permitting the handset to depress the switch plungers to an open circuit condition.

8 Claims, 3 Drawing Figures

PATENTED MAY 9 1972 3,662,109

INVENTOR.

Mark A. Beathan

BY

Lawrence E. Lautscher

ATTORNEY

HANDSET LIFTER

Desk and table telephones normally consist of a telephone base having dial or push button number selector means on the front face thereof and a pair of spaced cradle rests for the telephone receiver commonly known as a handset at the top of the base on either side of the front face. At least one switch operating plunger is mounted on the telephone base to contact the telephone receiver when the receiver is supported by the cradle rests to deactivate the instrument. To initiate operation of the telephone dial or push buttons, the instrument must first be activated by removing the receiver from the cradle rests to permit the switch operating plunger to move upwardly from a depressed position.

Desk and table telephones are extensively employed in offices and business establishments where the normal procedure required to accomplish the dialing of such telephones often proves inconvenient. It is necessary for a caller to employ both hands to hold the telephone receiver away from the cradle rests while dialing a desired number, thereby preventing the simultaneous manual accomplishment of other tasks.

Telephone accessories and attachments have been previously developed to support a telephone receiver during telephone use to free the hands of the telephone user. However such devices generally require that the telephone receiver first be manually removed from the cradle rest while the desired number is dialed and subsequently the receiver may be supported by means of the attachment on the body of the user or upon some closely adjacent support. None of these attachments facilitate the dialing of the telephone while the receiver remains in the cradle rests.

Accordingly, the primary object of the present invention is to provide a telephone accessory which is not attached to a telephone but which operates effectively to permit both the dialing of the telephone without removing the receiver thereof from the telephone cradle rests and the return of the receiver to the cradle rests with or without termination of an existing connection, as is desired. The connection may be maintained by placing the receiver squarely on the top horizontal plane of the accessory while the connection may be automatically broken by returning the receiver in an inclined attitude to contact a camming plane on the accessory to move the accessory to a circuit terminating position.

According to a more specific object of the invention, the telephone attachment includes a camming section formed in a unitary strip of sheet material which is adapted to slide between the cradle rests of a telephone. This camming section may be moved from an inactive position forwardly of the receiver to an active position beneath the receiver wherein the receiver is raised thereby from the cradle rests to activate the telephone.

In accordance with another object of the invention, the camming section is formed between an inclined face plate section and a rear section which are adapted to rest on the front and rear of the telephone base. Both the face plate and rear sections are provided with stop members which prevent the telephone accessory from sliding beyond the active and inactive positions on the telephone base. The face plate section may support an activating fingertip cushion and may be personalized with the name of the accessory owner or the name of a business firm and an advertising message.

Other objects and advantages of the invention will become apparent from a study of the following specification when viewed in light of the accompanying drawing in which.

Figure 1:
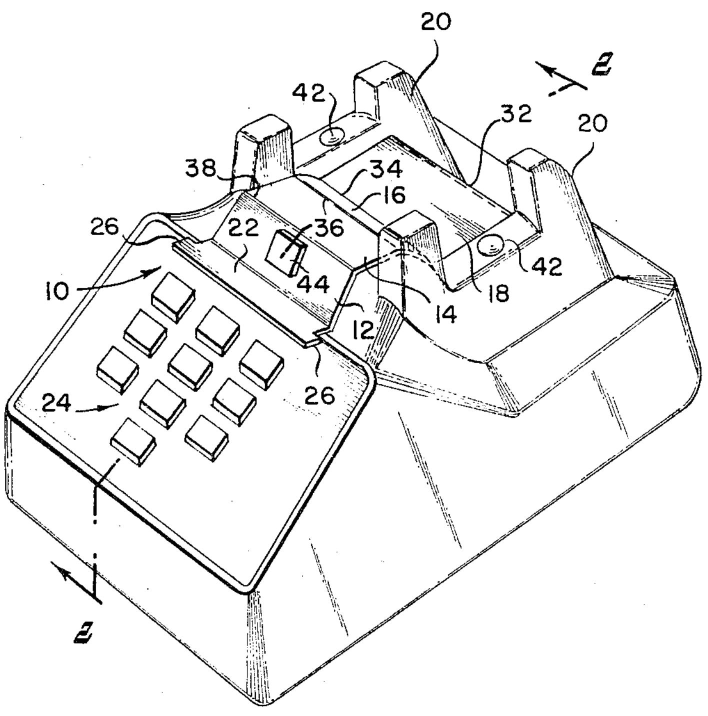
FIG. 1 is a top perspective view of the telephone accessory applied to a telephone base.
Figure 2:
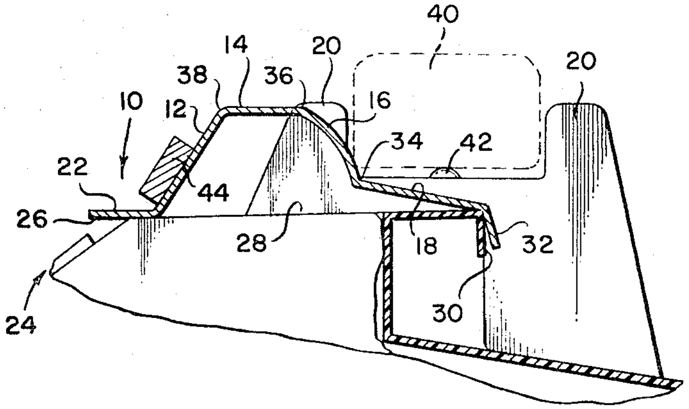
FIG. 2 is a sectional view taken along 2—2 of FIG. 1 with the telephone accessory in the inactive or retracted position.

Referring to the drawing, the telephone accessory 10 is formed from a unitary strip of sheet material, such as metal, plastic or the like, and includes a face plate section 12, a horizontal support section 14, a cam section 16 and a rear section 18. These sections are formed to a width which will permit the insertion of the telephone accessory between the spaced cradle rests 20 at the top of a conventional desk type telephone base in the manner illustrated by FIGS. 1 and 2.

The lower extremity of the face plate section 12 is angled outwardly to provide a projecting lip 22 which rests above telephone number selector means 24. Two abutment stops 26 project laterally from the sides of the lip 22, and these stops are adapted to seat against the front surfaces of the cradle rests when the telephone accessory is moved toward the rear of the telephone base. The number selector means may constitute either push buttons as illustrated or a conventional telephone dial.

The rear section 18 of the telephone accessory projects outwardly from the lower extremity of the cam section 16 and is adapted to extend along a top surface 28 of the telephone base. This top surface terminates abruptly at a rear wall 30 within the confines of the cradle rests 20, and the outer end of the rear section 18 is angled downwardly to form a lip 32 which engages this rear wall 30 in the forward position of the telephone accessory.

The cam section 14 joins the face plate and rear sections and rises above the rear section from a juncture 34 therewith to provide a receiver lifting surface. The cam section is formed by a substantially arcuate segment which curves upwardly from the rear section toward the face plate to a juncture 36 with the rear end of the horizontal support section 14. The horizontal support section joins the upper extremity 38 of the face plate and the cam section, and is formed to extend substantially parallel to the upper surface 28 of the telephone base when the telephone accessory is in the active receiver support position.

In the operation of the telephone accessory 10, the accessory is inserted between the cradle rests 20 of the telephone base in the inactive position (FIGS. 1 and 2), so that the rear section 18 thereof will rest on the surface 28 with the lip 32 in engagement with the upper rear wall 30 of the telephone base. The abutment stops 26 will be spaced forwardly of the cradle rests and the lip 22 will rest above the number selector means 24. The cam section 16 will not interfere with a telephone receiver or handset 40 in the inactive position of the telephone accessory, and the receiver may be supported by the cradle rests in the normal manner to depress activating plungers 42 and deactivate the telephone.

Figure 3:
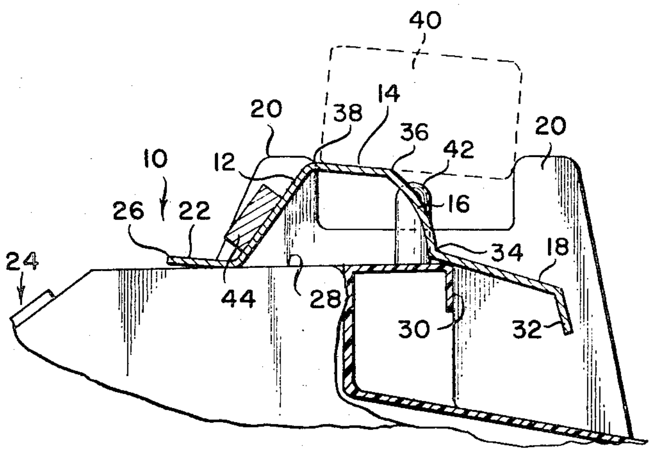
FIG. 3 is a sectional view taken along line 2—2 of FIG. 1 with the telephone accessory in the active or dialing position.

To activate the telephone for dialing without removing the receiver 40 from the cradle rests, a party needs to use only one hand to apply pressure to the face plate section 12, and a button 44 may be secured to the face plate section above the lip 22 to receive such pressure. The application of pressure to the button 44 causes the telephone accessory to slide toward the rear of the telephone base until the abutment stops 26 engage the cradle rests 20 as the accessory reaches the active position (FIG. 3). When the accessory moves rearwardly, the arcuate cam section 16 lifts the receiver 40 onto the horizontal support section 14, and the activating plungers 42 are permitted to rise and activate the telephone so that dialing may be accomplished.

It will be noted in FIG. 3 that the cam section 16 does not completely bridge the cradle rests 18 in the active position of the telephone accessory. Instead, a space is left between the cam section and the rear portion of the cradle rests to facilitate the automatic return of the telephone accessory to the inactive position when the receiver 40 is returned to the cradle rests.

The receiver 40 may be returned to the cradle rests 20 during an interruption of a conversation and the connection may still be maintained by placing the receiver squarely on the receiver support section 14. The weight of the receiver on the support section will not move the telephone accessory relative to the telephone base.

To automatically break a connection at the end of a telephone conversation, the receiver is returned to the cradle rests in an inclined attitude so that the weight of the receiver is applied to the cam section 16. This causes the telephone accessory to slide forwardly on the telephone base until the lip 32 again engages the rear wall 30, and the receiver is permitted to depress the activating plungers 42.

The prominence of the face plate in all positions of the telephone accessory makes it possible to provide individual or commercial data for display on the face plate.

It is apparent that other modifications may be made in the telephone accessory without deviating from the inventive concept set forth above. For example, the cam section 16 may be formed from one or more inclined segments rather than the preferred embodiment illustrated in the drawing.

What is claimed is:

1. A telephone accessory for use in connection with a desk type telephone to selectively raise and support the handset thereof from a rest position on a pair of spaced handset supporting cradle rests formed on the top of a telephone base to a height sufficient to permit switch operating plunger means to extend from said telephone base to a position to electrically connect said telephone instrument for dialing and transmission and reception, comprising an elongated unitary body member including contiguous longitudinally arranged base and cam section means each having a width that is less than the distance between said cradle rests, said base section means being adapted to rest on said telephone base between said cradle rests to support said telephone accessory for sliding movement between the cradle rests and said cam section means having a cam surface which extends upwardly from said base section means when said base section means rests against said telephone base, said cam surface extending upwardly to a point above the upper extremity of said switch operating plunger means in the activate position thereof.

2. The telephone accessory of claim 1 wherein said cam section means includes a handset support surface which extends from the uppermost extremity of said cam surface in a plane to provide support for said handset when said telephone accessory is moved from a first position wherein said base section means extends between said cradle rests beneath said handset and said cam section means is displaced horizontally from said handset to a second position in which said cam section means extends beneath said handset to permit extension of said plunger means to the connected position thereof.

3. The telephone accessory of claim 1 wherein said cam section means includes a handset support surface which extends from the uppermost extremity of said cam surface in a plane to provide support for said handset and an inclined face plate section extending downwardly away from said handset support surface, said face plate section being spaced from said cam surface and adapted to rest against the front surface of said telephone base.

4. The telephone accessory of claim 2 wherein an inclined face plate sections extends downwardly away from said handset support surface and includes laterally extending abutment stop means adapted to engage the front surface of said cradle rests when said telephone accessory is moved to said second position, said face plate section being spaced from said cam surface and adapted to rest against the front surface of the telephone base when said telephone accessory is in said first position.

5. The telephone accessory of claim 4 wherein said base section means includes stop means adapted to engage the rear side of said telephone base when said telephone accessory is in said first position.

6. The telephone accessory of claim 3 wherein said face plate section includes two abutment stops extending laterally therefrom at a point spaced from the juncture between said face plate section and handset support surface, said abutment stops extending the width of said face plate to a width greater than the space between said cradle rests, and said base section means includes a base surface extending from the lower extremity of said cam surface in a plane to overlie said telephone base, the outer extremity of said base surface being angled downwardly to form a stop adapted to engage the rear side of said telephone base.

7. The telephone accessory of claim 1 wherein said cam surface is of substantially arcuate configuration.

8. The telephone accessory of claim 6 wherein the lower extremity of said face plate section is angled outwardly to form a bearing lip and actuating means are secured to and project outwardly from said face plate for facilitating the manual position of said telephone accessory.

* * * * *